United States Patent Office 3,359,342
Patented Dec. 19, 1967

3,359,342
PRETREATING AND ISOMERIZING
α-PINENE
John Mentzer Derfer, Jacksonville, Fla., assignor to The Glidden Company, Cleveland, Ohio, a corporation of Ohio
No Drawing. Filed Jan. 16, 1967, Ser. No. 609,362
6 Claims. (Cl. 260—675.5)

ABSTRACT OF THE DISCLOSURE

A process for removing catalyst poisoners from α-pinene stock by contacting it in the presence of hydrogen with a Group VIII metal which may have insufficient catalyst activity to isomerize α-pinene to β-pinene and then isomerizing the pretreated stock with a hydrogen-acceptor catalyst under neutral to basic conditions at a temperature between about room temperature and about 300° C. The isomerization catalyst may be a catalytically active Group VIII metal.

---

This application is a continuation-in-part of a copending application, "Isomerization of Alpha-Pinene," filed Aug. 12, 1965, and assigned Ser. No. 479,275, now Patent No. 3,325,553, the latter being a continuation-in-part application of a prior application, "Alpha-Pinene Isomerization and Product," filed Feb. 19, 1964, and issued on Oct. 11, 1966, as Patent No. 3,278,623.

Background of the invention

Naturally-occurring β-pinene has been isolated from certain α-pinene-rich turpentines, for example, gum and sulfate turpentine from U.S. sources. Beta-pinene is useful as a raw material for producing terpene resins, myrcene and nopol (6,6-dimethyl bicyclo (3,1,1)-2-heptene-2 ethanol) regardless of its optical configuration, and is particularly valuable as a raw material in the synthesis of fine chemicals such as l-menthol and d-citronellol when such pinene has high optical activity (laevo rotation).

Alpha-pinene is much more abundant than β-pinene, but the alpha isomer has been less valuable as a starting material for chemical synthesis. Alpha-pinene is available from virtually all world turpentine suppliers, typically gum, wood and sulfate turpentine in the United States and from many foreign turpentines. Accordingly, there has been interest in converting α-pinene to β-pinene for a number of years, but the prospects for economic, commercial operation heretofore have been slight.

Prior attempts to obtain β-pinene have not been of commercial value because of the high proportions of undesirable by-products which hinder significantly a ready separation of α-pinene from β-pinene and a resulting economic recovery of β-pinene in high purity. The invention described and claimed in the Derfer U.S. Patent 3,278,-623 for the first time makes possible the economic recovery of β-pinene from a substantially non-destructive catalytic isomerization of α-pinene. Broadly, the process of this patent comprises establishing vapor or liquid phase contact between an α-pinene supply and a transitory hydrogen acceptor catalyst under neutral to basic conditions in a reaction zone maintained at a temperature within a range of about room temperature to about 300° C., and withdrawing from the reaction zone a novel isomerizate enriched in β-pinene.

While the process of the cited Derfer patent is, as indicated, the first successful, economic, commercial source of β-pinene by catalytic isomerization, it has been noted that the α-pinene supply tends to poison many catalysts employed, especially a preferred noble metal catalyst, palladium, and is deleterious to catalyst activity. The poisoning of the catalysts is due to the presence of several contaminants in the supply. While the principal offender appears to be chemically combined sulfur, still other ingredients poison the catalysts, such as certain organic chlorides, for example, those introduced by hypochlorite treatment of pinene, although other chlorides such as bornyl chloride and geranyl chloride have not been particularly harmful. As used here and in the claims, "pretreating" the α-pinene supply is intended to include the inhibition of one or all of such offending ingredients in the α-pinene supply from having such undesirable poisoning effect on an isomerization catalyst.

Summary

It has been discovered that a Group VIII metal in the presence of hydrogen is an effective sweetener of sour α-pinene stock prior to its isomerization by a hydrogen-acceptor catalyst. As used here and in the claims the phrase "Group VIII metal" is taken to mean a Group VIII metal of the Periodic Table of the Elements having an atomic number of 28 to 78, inclusive.

Inasmuch as the Derfer patent, No. 3,278,623, discloses that a Group VIII metal is an isomerization catalyst for α-pinene, at first blush (even ignoring the conjoint use with hydrogen), it would appear that the present invention is bottomed only on using an isomerization catalyst to prevent poisoning of an isomerization catalyst. However, such a hasty conclusion overlooks two significant results.

The first such result resides in prolonging the useful life of a charge or bed of catalyst in an isomerizing zone, particularly for a continuous isomerizing process. It is known that "shut-down" periods for equipment designed for isomerization or other catalytic activity are quite costly due to the loss of production time. By having two or more pretreating or "guard" zones, each individually and selectively connected in series only with an isomerizing zone, it is possible to pass successively from one pretreating zone to another while continuing to use the same isomerization zone. In this manner, the useful life of the isomerization catalyst, guarded against poisoning by the pretreating zone, may continue for a longer period of on-stream time with less frequent interruptions for exchange or replacement of spent isomerization catalyst, all brought about by the defined pre-use of a sweetening agent even though that agent may itself be an isomerization catalyst.

The second and more significant result is that it has surprisingly been discovered that a Group VIII metal which has insufficient activity to isomerize α-pinene may still have sufficient activity to sweeten an α-pinene stock. Accordingly, a Group VIII metal that has been discarded for isomerizing purposes because it is "spent" may in accordance with the present invention still be used to sweeten a sour α-pinene supply. Moreover, in doing so, the spent Group VIII metal prolongs the life of a catalytically active isomerization catalyst (such as a Group VIII metal) in the manner previously described.

Description of the preferred embodiments

Referring in greater detail to the pretreatment technique of the present inevntion, as indicated a metal from Group VII of the Periodic Table of the Elements, having an atomic number of 28 to 78, inclusive, is used to treat liquid α-pinene in the presence of hydrogen. Such meals include ruthenium, palladium, iridium, nickel, osminum, rhodium, and platinum. The metal is preferably precipitated on an inert or alkaline support, that is, one not acidic. Such a support may comprise charcoal, alumina, calcium carbonate, sodium carbonate, asbestos, dolomite, thoria, and the like.

The prime α-pinene supply which may be used is a pure or virtually pure α-pinene. However, the usual commercial grade of α-pinene distillate contains a percent or two of camphene as an indigenous impurity; such grade is economical and quite suitable for my purposes. Additionally, because β-pinene customarily is recovered by fractional distillation of sulfate or gum turpentine, one could use turpentine directly as the α-pinene supply, for example, by feeding it into a distillation unit and obtaining primarily α-pinene as an overhead distillate as the pinene supply for the isomerization reaction, while accumulating a bottoms product of β-pinene, dipentene, oxygenated materials and sesquiterpenes, e.g., anethole, caryophyllene, and methyl chavicol. The bottoms product could then be fractionated to recover β-pinene and the other high-boiling components. The pinene supply is, for all practical purposes, anhydrous.

As indicated, if many α-pinene supplies are used in an untreated form for the isomerization step, the catalyst life is quite short.

In general, an α-pinene supply is considered to require pretreatment if, when contacted by a one percent catalyst of 0.5 percent palladium on alumina for 0.5 hour at atmospheric reflux temperature, there is an increase of β-pinene in the supply of less than 4.5 percent.

The efficiency of the isomerization operation could, therefore, be substantially increased if catalyst poisoning were appreciably reduced or eliminated. Normally, the chief catalyst poisoner found in the α-pinene is sulfur which can be present in several chemically combined forms. However, still other compounds are known to be present in the α-pinene supply which poison the catalyst, such as the certain organic chlorides previously noted.

Hydrogen gas is bubbled through the α-pinene while it contains particles of the metal which preferably have a surface area of about 100 to 300 square meters per gram, as determined, for example, by the gas absorption method of Emmett and Teller. The action of the rising, bubbling gas tends to keep the metal particles fairly uniformly distributed throughout the pinene supply. With hydrogen being bubbled at a rate of about 1 ml. to about 10 ml. per minute through an α-pinene supply of about 1000 cubic centimeters, the pretreatment may last from about 2 hours to about 30 hours.

After pretreatment is completed, the α-pinene may be subjected to isomerization as described in the Defer patent, No. 3,278,623. For the substantially non-destructive isomerization of α-pinene to β-pinene, it is essential to maintain the reaction mixture and catalyst (and a catalyst support if one is used) non-acidic in any sense of the word, either where considered as a conventional acid of a conventionally measurable acidity by titration or the like, a Lewis acid, or a material which reacts with a Hammett indicator to give an acid indication. Thus, pure alumina, for example, from aluminum hydroxide or aluminum isopropylate, is a suitable support; whereas silica gel, which reacts as acid to neutral red Hammett indicator, is deleterious as are clays, silica-alumina, and other well-known petroleum cracking catalysts. Thus, the reaction environment should be neutral to basic when measured with neutral red Hammett indicator. Acidic material inherent in or sorbed on the catalyst on the catalyst support is quite detrimental.

The parent patent, No. 3,278,623, describes and illustrates various systems for isomerizing the α-pinene. As there disclosed, the apparatus employed may vary from a sealed steel bomb for the α-pinene supply and catalyst to an atmospheric fractionational distillation process wherein a concentration of the higher boiling β-pinene (as compared to α-pinene) gradually accumulates in collection vessels. The isomerization process can be either continuous or discontinuous, and in either case at superatmospheric, atmospheric, or moderately subatmospheric pressures. The α-pinene supply can also be either in the liquid or vapor phase during isomerization.

As described in Defer patent, No. 3,278,623, among the isomerization catalysts which may be employed are alkali metals and their $C_{3-6}$ alkoxides, sulfur, and iodine. However, the present invention is especially adapted to the use of a Group VIII metal as the isomerization catalyst. As such a metal becomes catalytically exhausted, it need not be effectively discarded but can serve as a sweetening agent in one or more pretreating zones in the manner previously described, each pretreating zone being in turn and independently of the others. In this manner, the effective life of isomerization catalyst is prolonged.

In room temperature operation with the catalysts of the present application, the equilibrium between α- and β-pinene that is approached in a practical operating period is about 3 percent β-pinene; at an operating temperature of about 150° C., it is about 4 percent; and at 220° C., it is about 5.5 to 7 percent β-pinene. For practical operating purposes, it is preferred to operate between about 150° C. and about 225° C. to obtain enhanced β-pinene concentration in the isomerizate. Above this temperature the formation of thermal isomerization and degradation products (by-products) appears to be accelerated when appreciable contact times are permitted, for example, a minute or more, between the catalyst and the pinene supply. Because substantial conversion of a α- to β-pinene can be achieved even closely approaching equilibrium in mere tenths of a second with a very active catalyst such as elemental palladium, it is possible to operate a a temperature as high as about 300° C. and still obtain reasonably good results by using a restricted average contact time, for example, by using a vapor phase operation.

In a flow operation the average contact time is computed as the quotient in consistent units of the pinene capacity of the catalytic reaction zone divided by the volumetric input of pinene supply thereto per unit time corrected to average temperature and pressure conditions in the catalytic reaction zone. Successful isomerization procedures have been carried out using contact times as low as a few tenths of a second upwards to many hours. For vapor phase operation and maximum use of a given volume of catalyst, it is preferred to use contact times between about 0.1 and about one second, or longer. In liquid phase operations, a contact time of about 0.5–2 minutes for efficiency and economy is preferred. The only criticality noted with respect to the length of contact time is the desirability to avoid prolonged times (over 60 seconds) in operations at a temperature about above 225° C. for suppression by-product formation.

A recommended recovery technique is that of fractional distillation at a maximum temperature not above 200° C. and preferably about 125° C. to suppress thermal formation of by-products in the distillation. Other conventional processes can be used in separating α- from β-pinene in the isomerizate as disclosed in the parent application, Patent No. 3,278,623.

The following examples are intended only to illustrate the invention and should not be construed in any way as limiting the disclosure. One skilled in the art of terpene chemical operations will recognize how important it is to suppress formation of related isomerization products such as menthadienes (limonene chiefly), camphene, cymene, and alloocimene because they boil relatively close to β-pinene and are comparatively difficult to separate therefrom efficiently.

The α-pinene supply used in all cases was recovered from sulfate turpentine, the technical grade containing 98 percent α-pinene and about two percent camphene as an indigenous impurity. Where a purer grade of α-pinene was used, containing less than about one percent extraneous materials, the pinene supply was considered "pure" for all practical purposes. In all cases quantitative analysis of the feed and output was done by vapor phase chromatography using as a base "Carbowax 20M," the trademark for an ethylene oxide condensation product having average molecular weight of about 20,000. All temperatures are given in degrees centigrade, and all percentages are weight percentages unless otherwise expressly indicated.

*Example 1*

Hydrogen gas was bubbled at the rate of 5 ml. per minute through one liter of sulfate turpentine for 25 hours at a temperature of atmospheric reflux. The turpentine contained one percent of a catalyst comprising 0.5 percent of palladium on alumina. Although no hydrogen sulfide gas was released, this pretreatment deodorized the sulfate turpentine to an odor more characteristic of that of gum turpentine. Even though a feed of hydrogen for 25 hours was employed to improve quality of turpentine, a period of as little as 4 hours has also been found useful.

Subsequently, the sweetened α-pinene stock was isomerized in a fractional distillation unit wherein one vessel which received the condensed distillate was charged with one percent of a 0.5 percent palladium on alumina as the catalyst. The useful life of this catalyst was prolonged as compared to its life when the α-pinene was not pretreated in accordance with this example.

*Example 2*

A pretreatment was carried out like the pretreatment of Example 1. Thereafter, the treated α-pinene was isomerized by a continuous method wherein heated α-pinene was passed through a catalyst chamber containing Raney nickel, activated prior to use with gaseous hydrogen for about one hour at 100° C. The catalyst chamber was contained in a molten salt bath of controlled temperature.

*Example 3*

A pretreatment was carried out like the pretreatment of Example 1, except that the Group VIII metal used was platinum. Following the pretreatment, the α-pinene was volatilized at about 170° C. and passed at the rate of about 3 ml. per minute under an inert solid carrier comprising 300 grams of sodium carbonate carrying 10 grams of sodium as a film. The platinum charge was converted into an α- to β-pinene equilibrium mixture with a minimum of production of such by-products as limonene and cymene. Isomerization continued until about 2000 ml. of α-pinene had been passed over the catalyst. At this point, the β-pinene formation began to diminish, and after 2300 ml. had been passed over the catalyst, no β-pinene was formed.

Condensation of the isomerized vapor after about 2000 ml. of α-pinene had been passed over the catalyst and analyzed as follows: 93 percent of α-pinene, 4.1 percent of β-pinene, and 2.8 percent of camphene.

While the foregoing describes several embodiments of the present invention, it is understood that the invention may be practiced in still other forms within the following scope of the claims.

What is claimed is:

1. A process of extending the useful life of a Group VIII metal as an isomerization catalyst in a process for the substantially non-destructive isomerization of α-pinene to β-pinene, which comprises:
pre-treating a sour α-pinene supply in a first zone at a temperature between about room temperature and about 300° C. in the presence of hydrogen with a metal from Group VIII of the Periodic Table having an atomic number of 28 to 78, inclusive,
said Group VIII metal having insufficient activity to catalyze an α- to β-pinene isomerization but sufficient activity effectively to sweeten the α-pinene supply,
and then contacting the pre-treated α-pinene supply while passing it through a second zone at a temperature between about room temperature and about 300° C. with a catalytically active Group VIII metal having an atomic number of 28 to 78, inclusive, said catalytically active metal being free of acidic support,
whereby the useful life of the catalytically active metal is appreciably extended and the isomerization process may continue with less frequent interruptions for exchange of isomerization catalyst by the defined pre-use of a metal of said Group VIII already unsuited for such catalytic isomerization.

2. The process of claim 1 wherein an inert support carries said Group VIII metal in the isomerization steps.

3. The process of claim 1 wherein said Group VIII metal is selected from the group consisting of nickel, ruthenium, rhodium, palladium, osmium, iridium, and platinum.

4. The process of claim 1 wherein hydrogen gas is bubbled through the α-pinene supply for about two hours to about thirty hours while said supply contains distributed therein particles of said Group VIII metal.

5. The process of claim 1 wherein said Group VIII metal used for pre-treating the sour α-pinene supply is spent isomerization catalyst.

6. A process of extending the useful life of a Group VIII metal as an isomerization catalyst in a process for the substantially non-destructive isomerization of α-pinene to β-pinene, which comprises:
pre-treating a sour α-pinene supply in a first zone at a temperature between about room temperature and about 300° C. in the presence of hydrogen with a metal from Group VIII of the Periodic Table having an atomic number of 28 to 78, inclusive,
said Group VIII metal having insufficient activity to catalyze an α- to β-pinene isomerization but sufficient activity effectively to sweeten the α-pinene supply,
and then contacting the pre-treated α-pinene supply at a second zone with a hydrogen-acceptor catalyst under neutral to basic conditions and at a temperature betwen about room temperature and about 300° C., said hydrogen-acceptor catalyst being free of acidic support,
whereby the useful life of the hydrogen-acceptor catalyst is appreciably extended and the isomerization process may continue with less frequent interruptions for exchange of isomerization catalyst.

References Cited

UNITED STATES PATENTS 2,951,888  9/1960  Carr _____ 260—683.65
3,312,750  4/1967  Berg _____ 260—675.5

DELBERT E. GANTZ, *Primary Examiner.*

G. E. SCHMITKONS, *Assistant Examiner.*